March 11, 1941.  P. F. KOCH  2,234,917
VARIABLE PITCH PULLEY
Filed July 31, 1940
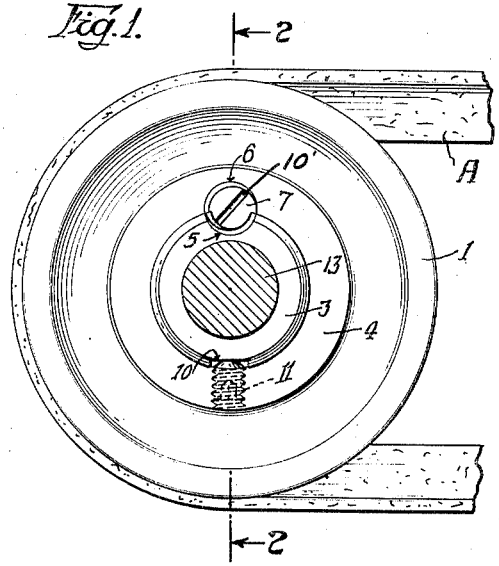
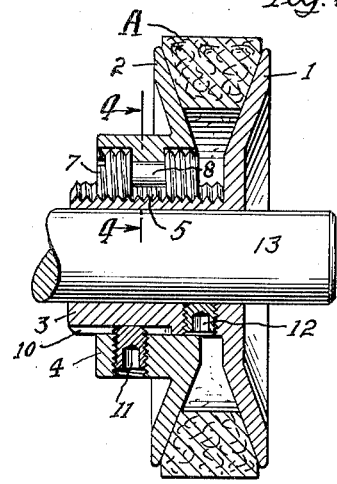
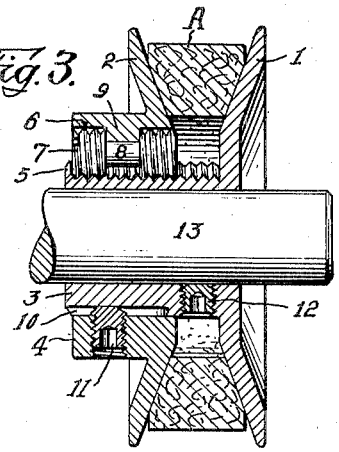
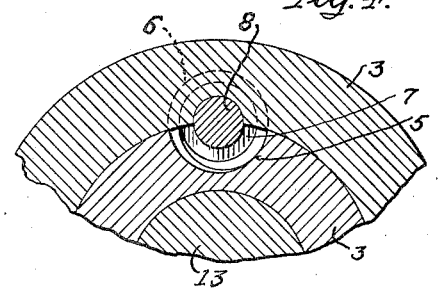
Inventor:
Paul F. Koch,
Wm. F. Freudenreich,
Attorney.
Witness:
E. Camporini
By:

Patented Mar. 11, 1941

2,234,917

UNITED STATES PATENT OFFICE 2,234,917

VARIABLE PITCH PULLEY

Paul F. Koch, Oak Park, Ill., assignor to Chicago Die Casting Manufacturing Company, a corporation of Illinois Application July 31, 1940, Serial No. 348,675

6 Claims. (Cl. 74—230.17)

The present invention relates to pulleys that have two discs or flanges adapted to be moved from and toward each other to vary their effective diameter when engaged by a V belt; and it has for its object to produce such a pulley which shall be simple in construction, very rugged, easy to adjust, and which is positively held in any state of adjustment.

The various features of novelty which characterize the present invention will hereinafter be pointed out with particularity in the appended claims; but, for a full understanding of the present invention and of its objects and advantages, reference may be had to the following detailed description, taken in connection with the accompanying drawing, wherein:

Figure 1 is a side view of a pulley embodying the present invention, a belt being shown therein; Fig. 2 is a section on line 2—2 of Fig. 1; Fig. 3 is a view similar to Fig. 2 illustrating a different state of adjustment; and Fig. 4 is a section on line 4—4 of Fig. 2.

Referring to the drawing, 1 and 2 represent two dished disks or flanges between which is created a deep peripheral V groove when they are placed together, face to face in pulley formation. The member 1 has a long central hub 3 projecting from the inner or working face, while the member 2 has a short thick hub 4 projecting from the outer side or back thereof and surrounding and fitting slidably upon the hub 3. This arrangement permits the two flanges to be brought close to each other or to be spread a considerable distance apart. Thus, in Fig. 2 the two flanges are so near to each other that the belt A, lying between them, projects somewhat beyond the periphery of the pulley. In Fig. 3 the flanges are spread farther apart and the belt has dropped well down into the peripheral groove in the pulley.

The hub 3 has in the periphery a longitudinal groove 5 that extends from the free end to the flange 1. This groove contains screw threads to form, in effect, a section of a cylindrical screw threaded bore somewhat less than 180 degrees in circumferential extent. The hub 4 contains, opening into the bore thereof, a recess or channel 6 which registers with a part of the groove 5. There are no screw threads in the recess or channel 6, which serves simply as a chamber to receive that part of a screw 7 lying in the groove 5 that projects above the groove. Although the screw lies loosely in the channel 6 it must be secured against lengthwise movement relatively to the hub 4 so that, when the screw is turned and pulls itself along the groove 5, it carries that hub and the corresponding flange with it. In the arrangement shown, the screw is mutilated to produce a part of reduced diameter, 8, or neck, between two virgin end sections. The channel or recess 6 contains a cross partition 9 that fits into the circumferential groove thus created in the screw and, preferably, provides an open bearing seat for the neck 8 as well as a stop to hold the screw and hub 4 together against relative endwise movements.

The outer end of the screw is preferably flush with the end face of the hub 4 and is suitably shaped for engagement with a tool for turning the same. In the arrangement shown, the screw contains a simple kerf 10' in its outer end face, so that it may be turned by means of a screw driver.

When the pulley is in use, the screw acts as a pin lying parallel to the axis of the pulley and locking the two flanges against relative rotation. In order to provide further security against relative turning movements of the flanges, a long narrow longitudinal channel 10 is formed in the periphery of the hub 3, and a set screw 11 extends radially into the hub 4, from the exterior, and into this channel.

The hub 3 may be provided with a set screw 12, similar to the screw 11, to secure the pulley to a shaft 13, extending through the pulley.

It will thus be seen that the pulley, proper, comprises only three rugged main parts, the two flanges with their hubs and the plug-like screw which is simply set in a cavity in one hub and then screwed into a trough in the other hub. Therefore, the device is very simple and sturdy in construction and adjustment of the assembled parts may easily be made. Since the final locking of the flanges against relative rotary movement is accomplished by a set screw that need never be lifted entirely out of the longitudinal channel with which it cooperates, the capacity to lock the flanges together does not depend upon the adjustment of the flanges from and toward each other; and, therefore, the adjustment of the flanges from and toward each other, and, consequently, the adjustment of the pitch diameter of the pulley may be made with great accuracy.

While I have illustrated and described with particularity only a single preferred form of my invention, I do not desire to be limited to the exact structural details thus illustrated and described, but intend to cover all forms and arrangements which come within the definitions of my invention constituting the appended claims.

I claim:

1. A pulley comprising two complementary flange sections; one of said sections having a long hub extending through the second section, the second section being provided with a hub surrounding the aforesaid hub, said long hub having in the periphery a longitudinal screw-threaded groove, and a short screw mounted in the second hub so as to be held against lengthwise movements relative to the latter while free to rotate therein indefinitely in either direction, said screw lying partly in said groove and having its threads meshing with those in the groove.

2. A pulley comprising two complementary flange sections having hubs, one of which surrounds the other, the inner hub having a long peripheral groove extending lengthwise thereof, the outer hub having a short groove registering with the aforesaid groove, the long groove being screw-threaded and the short groove being smooth, a short screw lying partly in each of said grooves and having screwthreads meshing with those in the long groove, and means to hold said screw against lengthwise movement relative to the outer hub and free to rotate indefinitely in either direction.

3. A pulley comprising two complementary flange sections having hubs one of which surrounds the other, the inner hub having a long peripheral groove extending lengthwise thereof, the outer hub having a short groove registering with the aforesaid groove, the long groove being screw-threaded and the short groove being smooth, a short screw lying partly in each of said grooves and having screwthreads meshing with those in the long groove, said screw containing a narrow channel extending around the same between the ends thereof, and a web arranged transversely of the groove in the outer hub and extending into said channel to hold the screw against lengthwise movement relative to the outer hub.

4. A pulley comprising two complementary flange sections; one of said sections having a long hub extending through the second section, the second section being provided with a hub surrounding the aforesaid hub, said long hub having in the periphery a longitudinal screw-threaded groove, a short screw mounted in the second hub so as to be held against lengthwise movements relative to the latter while free to rotate indefinitely therein, said screw lying partly in said groove and having its threads meshing with those in the groove, a second longitudinal groove in the long hub, and a set screw in the second hub in position to be extended into said second groove.

5. A pulley comprising two complementary flange sections having hubs, one of which surrounds the other, the inner hub having a long peripheral groove extending lengthwise thereof, the outer hub having a short groove registering with the aforesaid groove, the long groove being screw-threaded and the short groove being smooth, a short screw lying partly in each of said grooves and having screwthreads meshing with those in the long groove, and means to hold said screw against lengthwise movement relative to the outer hub, the outer end of the screw being flush with the end of the outer hub, and being formed to receive a tool to turn the same.

6. A pulley comprising two complementary flange sections having hubs one of which surrounds the other, the inner hub having a long peripheral groove extending lengthwise thereof, the outer hub having a short groove registering with the aforesaid groove, the long groove being screwthreaded and the short groove being smooth, a short screw lying partly in each of said grooves and having screwthreads meshing with those in the long groove, said screw having a reduced neck portion between the ends thereof, and a web arranged transversely of the groove in the outer hub forming a bearing for said neck portion to permit the screw to turn indefinitely and hold it against lengthwise movement relative to the outer hub.

PAUL F. KOCH.